(12) United States Patent
Meng et al.

(10) Patent No.: US 8,924,977 B2
(45) Date of Patent: Dec. 30, 2014

(54) SEQUENTIAL COOPERATION BETWEEN MAP AND REDUCE PHASES TO IMPROVE DATA LOCALITY

(75) Inventors: Xiaoqiao Meng, Yorktown Heights, NY (US); Jian Tan, Ossinging, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 13/525,778

(22) Filed: Jun. 18, 2012

(65) Prior Publication Data

US 2013/0339965 A1    Dec. 19, 2013

(51) Int. Cl.
*G06F 9/46*    (2006.01)

(52) U.S. Cl.
USPC .......................................................... 718/102

(58) Field of Classification Search
CPC .................................................... G06F 9/4881
USPC .......................................................... 718/102
See application file for complete search history.

(56) References Cited

U.S. PATENT DOCUMENTS

| | | | |
|---|---|---|---|
| 7,970,872 B2 | 6/2011 | Liu et al. | |
| 8,135,718 B1 | 3/2012 | Das et al. | |
| 8,209,695 B1 | 6/2012 | Pruyne et al. | |
| 8,230,070 B2 | 7/2012 | Buyya et al. | |
| 2003/0187907 A1* | 10/2003 | Ito | 709/102 |
| 2008/0133474 A1 | 6/2008 | Hsiao et al. | |
| 2008/0263559 A1 | 10/2008 | Das et al. | |
| 2010/0281166 A1 | 11/2010 | Buyya et al. | |
| 2010/0293551 A1 | 11/2010 | Ajima et al. | |
| 2011/0119680 A1 | 5/2011 | Li et al. | |
| 2011/0154341 A1 | 6/2011 | Pueyo et al. | |
| 2011/0167149 A1 | 7/2011 | Lee et al. | |
| 2011/0282982 A1 | 11/2011 | Jain | |
| 2012/0042319 A1 | 2/2012 | Hildrum et al. | |
| 2012/0110047 A1 | 5/2012 | Hildrum et al. | |
| 2012/0151292 A1 | 6/2012 | Rowstron et al. | |
| 2012/0198466 A1 | 8/2012 | Cherkasova et al. | |
| 2012/0226639 A1 | 9/2012 | Burdick et al. | |

(Continued)

FOREIGN PATENT DOCUMENTS

| | | |
|---|---|---|
| WO | 2011153242 | 6/2011 |
| WO | 2012027478 | 8/2011 |

OTHER PUBLICATIONS

Fei Teng, Lei Yu, Frédéric Magoulès, Scheduling Performance of Real-Time Tasks on MapReduce Cluster, Proceedings of the International Conference on Human-centric Computing 2011, Springer Science+Business Media B.V. 2011.*

(Continued)

*Primary Examiner* — Emerson Puente
*Assistant Examiner* — Charlie Sun
(74) *Attorney, Agent, or Firm* — Ference & Associates LLC

(57) ABSTRACT

Methods and arrangements for task scheduling. At least one job is assimilated from at least one node, each job comprising at least a map phase and a reduce phase, each of the map and reduce phases comprising at least one task. Progress of a map phase of at least one job is compared with progress of a reduce phase of at least one job. Launching of a task of a reduce phase of at least one job is scheduled in response to progress of the reduce phase of at least one job being less than progress of the map phase of at least one job.

12 Claims, 9 Drawing Sheets

(56) References Cited

U.S. PATENT DOCUMENTS

| | | | |
|---|---|---|---|
| 2012/0284727 | A1 | 11/2012 | Kodialam et al. |
| 2012/0330864 | A1 | 12/2012 | Chakrabarti et al. |
| 2013/0024012 | A1* | 1/2013 | Ballintine et al. ............ 700/17 |
| 2013/0024412 | A1 | 1/2013 | Gong et al. |
| 2013/0031558 | A1 | 1/2013 | Balmin et al. |
| 2013/0104135 | A1* | 4/2013 | Cai et al. ....................... 718/102 |
| 2013/0104140 | A1 | 4/2013 | Meng et al. |
| 2013/0290976 | A1* | 10/2013 | Cherkasova et al. ......... 718/104 |
| 2014/0019987 | A1* | 1/2014 | Verma et al. .................. 718/103 |

OTHER PUBLICATIONS

Matei Zaharia, Dhruba Borthakur, Joydeep Sen Sarma, Khaled Elmeleegy, Scott Shenker, Ion Stoica, Job Scheduling for Multi-User MapReduce Clusters, Technical Report No. UCB/EECS-2009-55, Apr. 30, 2009.*

Lin, Jimmy et al., "Of Ivory and Smurfs: Loxodontan MapReduce Experiments for Web Search", Nov. 2009, TREC 2009 DTIC Document, 11 pages, University of Maryland, USA.

Wang, Xiaowei et al., "Dynamic Split Model of Resource Utilization in MapReduce", DataCloud-SC'11, Nov. 14, 2011, 10 pages, Seattle, Washington, USA.

Isard, Michael et al., "Quincy: Fair Scheduling for Distributed Computer Clusters", SOSP'09, Oct. 11-14, 2009, 16 pages, Big Sky, Montana, USA.

Zaharia, Matei et al., "Delay Scheduling a Simple Technique for Achieving Locality and Fairness in Cluster Scheduling", In Eurosys, Apr. 2010, 30 pages, Paris, France.

Anathanarayanan, G., et al., "Reining the Outliers in Map-Reduce Clusters using Mantri", Microsoft Research Technical Report, Jun. 2010, 24 pages, Techical Report MSR-TR-2010-69, Microsoft Corporation, Redmond, Washington, USA.

Dean, J., et al., "MapReduce: Simplified Data Processing on Large Clusters", Communications of the ACM, 50th Anniversary Edition, Jan. 2008, vol. 51, Issue 1, pp. 107-113, ACM, New York, New York, USA.

Hammoud, M., et al., "Locality-Aware Reduce Task Scheduling for MapReduce", 2011 Third IEEE International Conference on Cloud Computing Technology and Science (CloudCom), Nov. 29-Dec. 1, 2011, Athens, Greece, 7 pages.

Hindman, B., et al., "Mesos: A Platform for Fine-Grained Resource Sharing in the Data Center", Technical Report, University of California, Berkeley, Sep. 30, 2010, 14 pages.

Isard, M., et al., "Dryad: Distributed Data-Parallel Programs from Sequential Building Blocks", 2nd ACM SiGOPS/EuroSys European Conference on Computer Systems, Mar. 21-23, 2007, 14 pages, ACM, Lisboa, Portugal.

Zaharia, M., et al., "Improving MapReduce Performance in Heterogeneous Environments", Proceedings of the 8th USENIX conference on Operating systems Design and Implementation (OSDI'08), 14 pages.

Palanisamy, B., et al., "Purlieus: Locality-aware Resource Allocation for MapReduce in a Cloud", Proceedings of 2011 International Conference for High Performance Computing, Networking, Storage and Analysis, SC'11, Nov. 12-18, 2011, 11 pages, ACM, Seattle, Washington, USA.

Verma, A., et al., "ARIA: Automatic Resource Inference and Allocation for MapReduce Environments", HP Laboratories, Report HPL-2011-58, approved for publication in 8th IEEE International Conference on Autonomic Computing (ICAC'2011), Jun. 14-18, 2011, 11 pages, IEEE, Karsruhe, Germany.

Wolf, J., et al., "FLEX: A Slot Allocation Scheduling Optimizer for MapReduce Workloads", Middleware 2010, vol. 6452 of Lecture Notes in Computer Science, 20 pages, Springer Berlin/Heidelberg, Germany.

Zaharia, M., et al., "Job Scheduling for Multi-User MapReduce Clusters", Electrical Engineering and Computer Sciences, University of California at Berkeley, Technical Report, No. UCB/EECS-2009-55, Apr. 30, 2009, 14 pages, University of California at Berkeley, Berkeley, California, USA.

Dean, Jeffrey et al., "MapReduce: Simplified Data Processing on Large Clusters," OSDI'04 Technical Program, Oct. 3, 2004.

Derman, Cyrus et al., "A Sequential Stochastic Assignment Problem," Management Science, Mar. 1972, 8 pages, vol. 18, No. 7, Informs, Institute for Operations Research and the Management Sciences. Publisher contact http://www.jstor.org/action/showPublisher:publisherCode=informs.

Polo, Jorda et al., "Resource-aware Adaptive Scheduling for MapReduce Clusters," Proceedings of the 12th ACM/IFIP/USENIX International Conference on Middleware, Lisboa, Portugal, Dec. 12-16, 2011, 21 pages.

Sandholm, Thomas et al., "Dynamic Proportional Share Scheduling in Hadoop," JSSPP 2010, pp. 110-131, Springer-Verlag Berlin Heidelberg, Germany.

Guo, Zhenhua et al., "Investigation of Data Locality in MapReduce," Proceedings of the 2012 12th IEEE/ACM International Symposium on Cluster, Cloud and Grid Computing, CCGRID'12, Ottawa, Canada, May 13-16, 2012, 8 pages.

Tan, Jian et al., "Performance Analysis of Coupling Scheduler for MapReduce/Hadoop," The 31st Annual International Conference on Computer Communications: Mini-Conference, Orlando, Florida, USA, Mar. 25-30, 2012, 5 pages.

Kavulya, Soila et al., "An Analysis of Traces from a Production MapReduce Cluster," CMU-PDL-09-107, Parallel Data Laboratory, Carnegie Mellon University, Dec. 2009, 18 pages, Carnegie Mellon University, Pittsburgh, Pennsylvania, USA.

Condie, Tyson et al., "MapReduce Online," Proceedings of the 7th USENIX Conference on Networked Systems Design and Implementation, NSDI'10, San Jose, California, USA, Apr. 28-30, 2010, 16 pages, See asterix on first page of pdf.

Wang, Yandong, "Hadoop Acceleration Through Network Levitated Merge," SC11, Seattle, Washington, USA, Nov. 12-18, 2011, 10 pages, ACM Digital Library.

Dai, Jinquan et al., "HiTune: Dataflow-Based Performance Analysis for Big Data Cloud," Proceedings of the 3rd USENIX Conference on Hot Topics in Cloud Computing, Portland, Oregon, USA, Jun. 14-15, 2011, 15 pages, See asterix on first page of pdf.

Schwarzkopf, Malte et al., "The seven deadly sins of cloud computing research," Proceedings of the 4th USENIX Conference on Hot Topics in Cloud Computing, HotCloud'12, Boston, Massachusetts, USA, Jun. 12-13, 2012, 6 pages, See asterix on first page of pdf.

Chen, Fangfei et al., "Joint Scheduling of Processing and Shuffle Phases in MapReduce Systems," Proceedings of 31st Annual IEEE INFOCOMM Conference, Orlando, Florida, USA, Mar. 25-30, 2012, pp. 1143-1151, IEEE Digital Library.

IP.com, "Optimizing MapReduce Scheduling at the Task-Level," Prior Art Database Technical Disclosure, IPCOM000217108D, May 3, 2012, 6 pages.

Wierman, Adam et al., "Classifying Scheduling Policies with Respect to Unfairness in an M/GI/1." SIGMETRICS'03, San Diego, California, USA, Jun. 10-14, 2003, 12 pages, ACM Digital Library.

Polo, Jorda, et al., "Performance-Driven Task Co-Scheduling for MapReduce Environments", Network Operations and Management Symposium (NOMS), 2010 IEEE, Apr. 19-23, 2010, 8 pages, Osaka, Japan.

* cited by examiner

1: Comment: This computation is invoked for every job on a received heartbeat.
2: if job.pendingReduces > 0 then
3:     $\delta = 1-\exp(-\text{job.desiredReduces}/3)$
4:     unit=$\delta \times$job.desiredMaps/job.desiredReduces
5:     mapProgress=job.finishedMaps/unit
6:     redProgress=job.finishedReduces+job.runningReduces+1
7:     mismatch = (mapProgress - redProgress)/job.desiredReduces
8:     if job.pendingMaps == 0 then
9:         mismatch = 4 + 1/job.pendingReduces
10:     end if
11: else
12:     mismatch = 0
13: end if

```
1:  Static values: candidate = NULL, wait = 0, m° = 0
2:  Input: Receive a heartbeat from node v; The cluster has N nodes.
3:  Output: Compute the task assignment of reducers on node v.
4:  if candidate == NULL then
5:     Loop over all jobs and find the one (J) with the largest
       mismatch (m°), tie-breaking through randomly selecting one.
6:     if m° > 0 then
7:        candidate = J
8:     end if
9:  else
10:    wait = wait + 1
11:    for i = 1 to 3 do
12:       if (i − 1) × N < wait <= i × N AND v ∈ L'(J) AND
          node v has no running reducers of J then
13:          if successfully launch a reducer of job J on node v then
14:             candidate = NULL, wait = 0
15:          else
16:             wait = i × N + 1
17:          end if
18:       end if
19:    end for
20:    if 3N < wait ≤ 4N then
21:       if successfully launch a reducer of job J on node v then
22:          candidate = NULL, wait = 0
23:       end if
24:    end if
25:    if wait > 4N then
26:       candidate = NULL, wait = 0
27:    end if
28: end if
```

FIG. 6

1: Input: A list $L$ of map task candidates computed when ignoring data locality constraints.
2: Output: A subset $L^\circ$ of $L$ to be launched; initially $L^\circ = \emptyset$.
3: for all $j \in L$ do
4:    Compute $p_j$ using (3).
5:    if rand $< p_j$ then
6:      Comment: rand is uniformly random on $[0,1]$
7:      $L^\circ = L^\circ \cup \{j\}$
8:    end if
9: end for

SEQUENTIAL COOPERATION BETWEEN MAP AND REDUCE PHASES TO IMPROVE DATA LOCALITY

BACKGROUND

An effective framework involves distributed parallel computing, which operates to disperse processing tasks across multiple processors operating on one or more computing devices such that parallel processing may be executed simultaneously. Important implementations of large scale distributed parallel computing systems are MapReduce by Google®, Dryad by Microsoft®, and the open source Hadoop® MapReduce implementation. Google® is a registered trademark of Google Inc. Microsoft® is a registered trademark of the Microsoft Corporation in the United States, other countries, or both. Hadoop® is a registered trademark of the Apache Software Foundation.

Generally, MapReduce has emerged as a dominant paradigm for processing large datasets in parallel on compute clusters. As an open source implementation, Hadoop has become popular in a short time for its success in a variety of applications, such as social network mining, log processing, video and image analysis, search indexing, recommendation systems, etc. In many scenarios, long batch jobs and short interactive queries are submitted to the same MapReduce cluster, sharing limited common computing resources with different performance goals. It has thus been recognized that, in order to meet these imposed challenges, an efficient scheduler can be helpful if not critical in providing a desired quality of service for the MapReduce cluster.

Conventionally, efforts have been made to effect such service, but significant shortcomings have been noted. First, it is usually the case conventionally that only the fairness of the map phase is guaranteed, without guaranteeing fairness for reducers in that reducers are launched greedily to a maximum. As such, to allocate excess computing resources without balancing with map progress can will lead to underutilization. Secondly, most of the scheduling schemes on data locality only consider local inputs for map tasks and ignore a need for intermediate data generated from mappers to be fetched by reducers, through either networks or local disks. A consequence is that future run-time information becomes unavailable when scheduling reducers. A greedy approach for launching reducers, as undertaken by conventional schedulers, can make wrong decisions at the beginning in its detachment from evolving job dynamics.

In conventional arrangements where a type of delayed scheduling is used to improve the data locality for map tasks, it can be seen that the introduced delays degrade performance in heterogeneous environments, e.g., when the input data are not distributed evenly over a large fraction of nodes in the computing cluster. This can cause under-utilization and instability, in that the number of mappers running simultaneously will not reach a desired level, and will vary greatly over time.

BRIEF SUMMARY

In summary, one aspect of the invention provides a method comprising: assimilating at least one job from at least one node, each job comprising at least a map phase and a reduce phase, each of the map and reduce phases comprising at least one task; comparing progress of a map phase of at least one job with progress of a reduce phase of at least one job; and scheduling launching of a task of a reduce phase of at least one job in response to progress of the reduce phase of at least one job being less than progress of the map phase of at least one job.

Another aspect of the invention provides an apparatus comprising: at least one processor; and a computer readable storage medium having computer readable program code embodied therewith and executable by the at least one processor, the computer readable program code comprising: computer readable program code configured to assimilate at least one job from at least one node, each job comprising at least a map phase and a reduce phase, each of the map and reduce phases comprising at least one task; computer readable program code configured to compare progress of a map phase of at least one job with progress of a reduce phase of at least one job; and computer readable program code configured to schedule launching of a task of a reduce phase of at least one job in response to progress of the reduce phase of at least one job being less than progress of the map phase of at least one job.

An additional aspect of the invention provides a computer program product comprising: a computer readable storage medium having computer readable program code embodied therewith, the computer readable program code comprising: computer readable program code configured to assimilate at least one job from at least one node, each job comprising at least a map phase and a reduce phase, each of the map and reduce phases comprising at least one task; computer readable program code configured to compare progress of a map phase of at least one job with progress of a reduce phase of at least one job; and computer readable program code configured to schedule launching of a task of a reduce phase of at least one job in response to progress of the reduce phase of at least one job being less than progress of the map phase of at least one job.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 4 sets forth an algorithm for computing a mismatch value.

FIG. 6 sets forth an algorithm for wait scheduling.

FIG. 7 sets forth an algorithm for random peeking scheduling.

DETAILED DESCRIPTION

Figure 1:
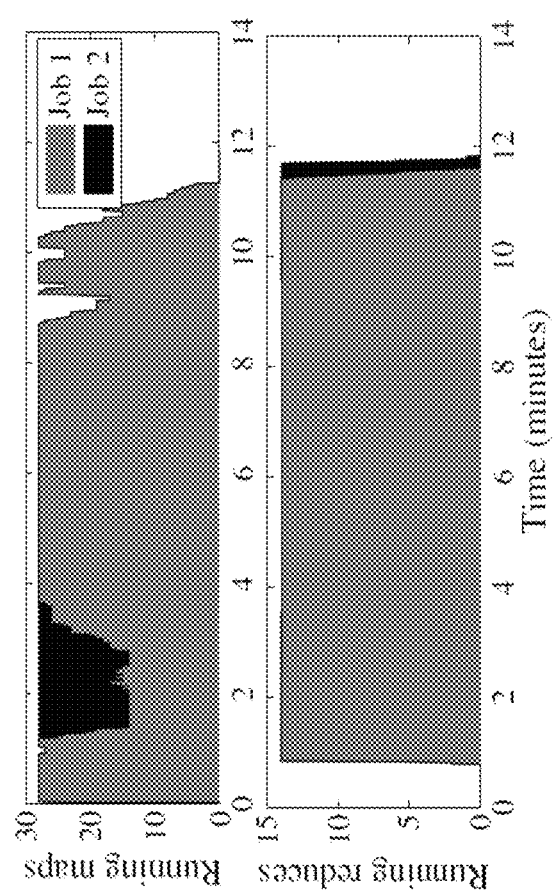
FIG. 1 graphically illustrates map and reduce task performance with a conventional scheduler.

For further background information, including details relating to at least one environment or context in which embodiments of the invention may be employed, incorporated herein by reference, as if set forth in its entirety herein, is co-pending and commonly assigned U.S. patent application Ser. No. 13/278,383, entitled "Resource Aware Scheduling In a Distributed Computing Environment", filed Oct. 21, 2011, inventors Xiaoqiao Meng et al.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-7. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 9. In accordance with an example embodiment, most if not all of the process steps, components and outputs discussed with respect to FIGS. 1-7 can be performed or utilized by way of a processing unit or units and system memory such as those indicated, respectively, at 16' and 28' in FIG. 9, whether on a server computer, a client computer, a node computer in a distributed network, or any combination thereof.

Broadly contemplated herein, in accordance with at least one embodiment of the invention, is a resource-aware scheduler, also referred to herein as a "coupling scheduler." It couples the respective progress of map and reduce tasks to mitigate starvation, and jointly optimizes placements for both of them to improve overall data locality. Specifically, a process of "wait scheduling" can be used for reducers and "random peeking scheduling" for mappers, while also taking into consideration the interactions between these processes, to holistically optimize the data locality.

By way of general background in accordance with at least one embodiment of the invention, a typical Hadoop job contains both map and reduce phases. In the map phase, each map task processes a block of the input data from a distributed file system in the cluster, and generates intermediate data in key-value pairs. In the reduce phase, reduce tasks fetch these intermediate data according to keys from every map task and sort them (in a copy/merge phase) before applying the reduce function. If the input data to a mapper is from a local disk, then it reads faster and can reduce the need for network resources.

Further, by way of general background in accordance with at least one embodiment of the invention, Hadoop client applications can typically submit jobs to a job tracker for scheduling. The job tracker running on the master node is responsible for launching map and reduce tasks through the scheduler to task trackers that run on the slave nodes. Hadoop normally attends to configuring the number of map and reduce slots for each slave node. A slot is essentially a virtual token, and each slot can only grant a single task to run at any time. The whole scheduling process is conducted through a heartbeat mechanism, with each task tracker periodically reporting its status to the job tracker. The status information for the tasks running on the slave node includes progress of tasks, submission times, map output bytes, etc. In response, the job tracker replies with a task assignment, which determines the tasks, from one job or another, to be launched on a given task tracker.

Additionally, by way of general background in accordance with at least one embodiment of the invention, it can be recognized that an interdependence between map and reduce tasks can lead to starvation. Map tasks tend to be small and independent, which can run in parallel. In contrast, reducers tend to be long-running tasks that contain copy/merge and reduce phases. Conventionally, it is typically seen that a job that has launched a reducer will not release an occupied slot until its reduce phase completes.

Furthermore, by way of general background in accordance with at least one embodiment of the invention, it is conventionally seen that once a certain number of map tasks of a job finish and generate some intermediate data, the reduce tasks are launched in a greedy manner to the maximum extent that is possible in the given context. This is because the intermediate data generated by map tasks may have data that needs to be fetched by every reducer of the same job. Thus, overlapping the copy/shuffle phases of reduce tasks and the execution of map tasks can reduce job processing delays. However, with jobs sharing the same cluster, this greedy approach to launching reducers for existing jobs may starve other newly joined jobs that have just finished the map phase and are waiting for available reduce slots. This starvation problem has been found to be even more pronounced for typical workflows that include small jobs following large ones.

FIG. 1 graphically illustrates map and reduce task performance with a conventional scheduler. Particularly, FIG. 1 plots the number of map and reduce tasks running simultaneously at every time point based on an experiment conducted for two Grep jobs. (Grep jobs, as known, can be performed in the context of Hadoop) As seen here, Job 1 accepts all reduce slots at time 0.9 (minutes), just before job 2 is submitted at time 1.0. Thus, even when Job 2 finishes its mappers at time 3.8 minutes, it cannot launch its reducers until Job 1 releases some reduce slots at time 11.3. Accordingly, this can be construed as not being fair for reducers.

In accordance with at least one embodiment of the invention, this problem can avoided or alleviated from the outset. While it is recognized that future run time information can be difficult to predict, especially when new jobs keep arriving randomly, a simple and effective approach is possible wherein reducers are launched gradually (i.e., the percentage y of started reducers) according to the progress of the mappers (i.e., the percentage x of completed map tasks), satisfying $y=f(x)$, $[0,1] \rightarrow [0,1]$. If reduce progress lags behind map progress $y<f(x)$, then the job at hand should have a better opportunity to launch reducers; otherwise it should not be aggressive in acquiring more slots that potentially can be utilized by others.

Figure 2:
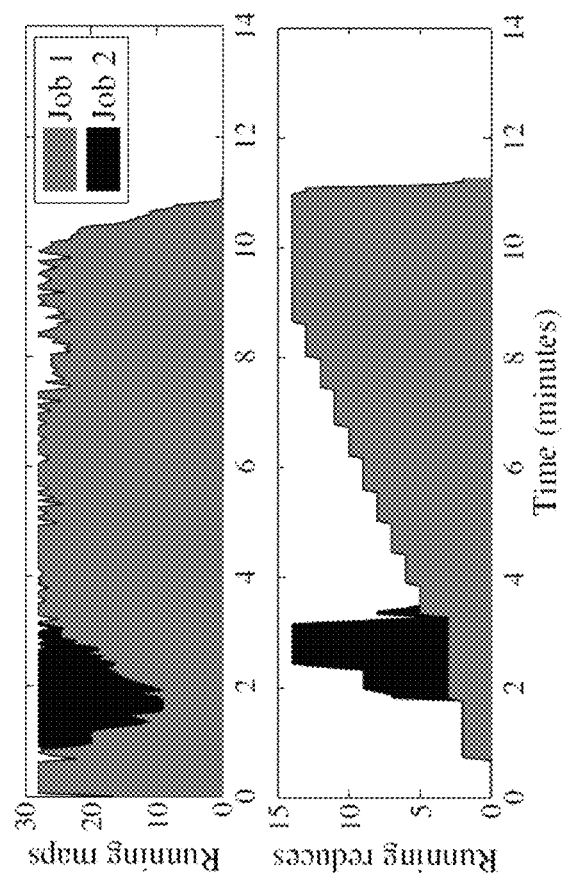
FIG. 2 graphically illustrates map and reduce task performance with a scheduler according to at least one embodiment of the invention.

Accordingly, repeating the same experiment as in the case of FIG. 1, FIG. 2 shows how the starvation problem can be mitigated with an approach in accordance with at least one embodiment of the invention, thus according more fairness to reducers.

Generally, in accordance with at least one embodiment of the invention, a gradual launching of reducers, depending on map progress, permits new channels for optimizing data locality jointly for both mappers and reducers, which is absent in conventional approaches. Mappers take the input data and reducers fetch the intermediate data through either network or local disk. A joint type of control places map tasks close to the input data and the running reducers, and places reducers close to a "centrality" of the already generated intermediate data stored on the assumed Hadoop tree network. The placements of mappers determine where the intermediate data are generated and stored. In turn, the placements of reducers impact how map outputs are fetched. However, it is difficult to predict the future run-time information, e.g., map output bytes, competitions among multiple jobs, etc. A greedy approach for launching reducers, as employed conventionally, can make wrong decisions at the beginning since there is no awareness of evolving job dynamics. For long-running reducers, an early mistake takes much more effort to correct.

As such, in accordance with at least one embodiment of the invention, a gradual launching of reducers opens up new possibilities for forming a cooperation between map and reduce phases. Particularly, both mappers and reducers initially may not be attuned to their optimal placements by way of a common goal of better data locality; however, as the job evolves, new run-time information becomes available such that mappers and reducers alike can alternatively be optimized on a stepwise basis, depending on decisions rendered by the other phase. In other words, a mapper can be optimized based on decisions rendered in one or more recent reduce phases, and a reducer can be optimized based on decisions rendered in one or more recent map phases.

The disclosure now turns to a more detailed discussion of wait scheduling for reducers and random peeking scheduling for mappers, in accordance with at least one embodiment of the invention.

Figure 3:
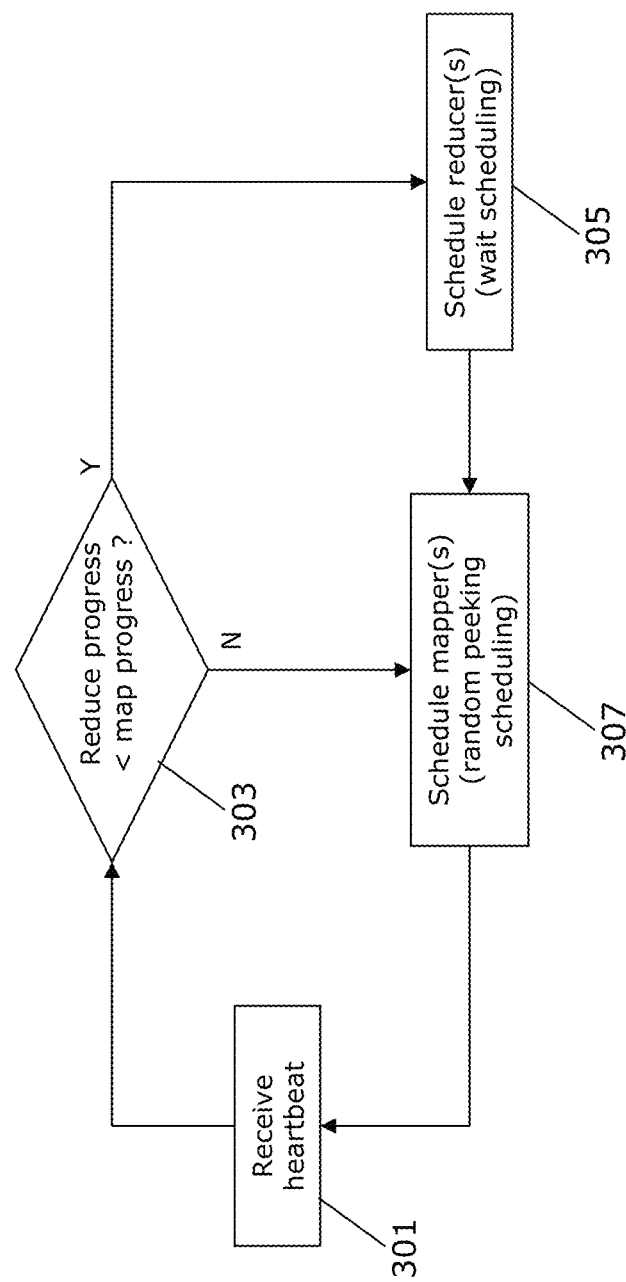
FIG. 3 provides a schematic illustration of a process of a coupling scheduler.

In accordance with at least one embodiment of the invention, FIG. 3 provides a schematic illustration of a process of a coupling scheduler. The scheduler loops over all jobs present in a queue when scheduling reducers. It compares the progress of map and reduce tasks, respectively, in each job to determine the job whose reduce task progress lags the most behind its map task progress as a candidate for launching reducers. In terms of scheduling mappers, it relies on the random peeking scheduling to improve data locality by relaxing fairness constraints through a randomized algorithm. As such, the interactions between mappers and reducers follow two guiding principles. In a first principle, a preference is effected for launching map tasks that include local data and that are close to running reducers of the same job. In a second principle, new reducers are placed close to optimal nodes to minimize a total network cost of transferring already-generated intermediate data.

Generally, as shown in FIG. 3, and in accordance with at least one embodiment of the invention, a heartbeat is received (301) and a check is made as to whether reduce progress is less (i.e., less further along) than map progress (303). If no, one or more mappers are scheduled (307), e.g., via random peeking scheduling. If yes, one or more reducers are scheduled (305), e.g. via wait scheduling, and the process then proceeds to mapper scheduling (307). In either case, the process then starts anew with receipt of another heartbeat (301). The steps shown in FIG. 3, and components for carrying out the same, will be better understood and appreciated from discussion herethroughout.

In accordance with at least one embodiment of the invention, the scheduling of a reducer depends on map progress. As discussed variously herein, a gradual launching of reducers, as a matter of dependence on map progress, provides an approach that is more fair to reducers, and also mitigates a starvation problem. Further, waiting scheduling for reducers permits a sequential control between map and reduce phases to jointly improve data locality. Additionally, a sync problem in the copy/shuffle phase is alleviated, and performance is improved by reducing disk I/O and network contention. In addition, if a job stops launching mappers due to other jobs having higher priorities, its reducers accordingly stop acquiring more slots.

In accordance with at least one embodiment of the invention, a coupling scheduler uses a mismatch value to describe the difference in progress between mappers and reducers. Thus, for job i, it matches the fraction $x_i$ of mappers that are completed and the fraction $y_i$ of reducers that have been launched. Job i is associated with a function $f_i(x): [0,1] \rightarrow [0,1]$. When $y_i < f_i(x_i)$, job i should have a better opportunity to launch reducers; otherwise, it should not acquire more slots. Here, one embodiment of the implementation, in accordance with an illustrative example, involves choosing $f_i(x) \equiv f(x)$ for all i.

In accordance with at least one embodiment of the invention, FIG. 4 sets forth an algorithm 409 for computing the aforementioned mismatch value. Generally, the scheduler loops over all jobs present in the queue, and the job with the largest mismatch value is designated as a candidate to launch reducers. In algorithm 409, job.desiredMaps and job.desiredReduces denote, respectively, the total number of map and reduce tasks of the job. The parameter δ indicates that all reducers of a job can be launched before it finishes a fraction δ of its map tasks. On line 3, a smaller δ is assigned to jobs with fewer reducers, meaning that their reducers can be launched earlier. On line 9, a job's mismatch is increased when it has no pending mappers but still has pending reducers, with priority given to a job with the fewest number of pending reducers. The form 4+1/job.pendingReduces is chosen in view of line 7, which normalizes the mismatch value on [0,1/δ] with δ>0.25 and 1/0.25=4. Thus, the jobs that only have pending reducers involve larger mismatch values than jobs with pending mappers.

Figure 5:
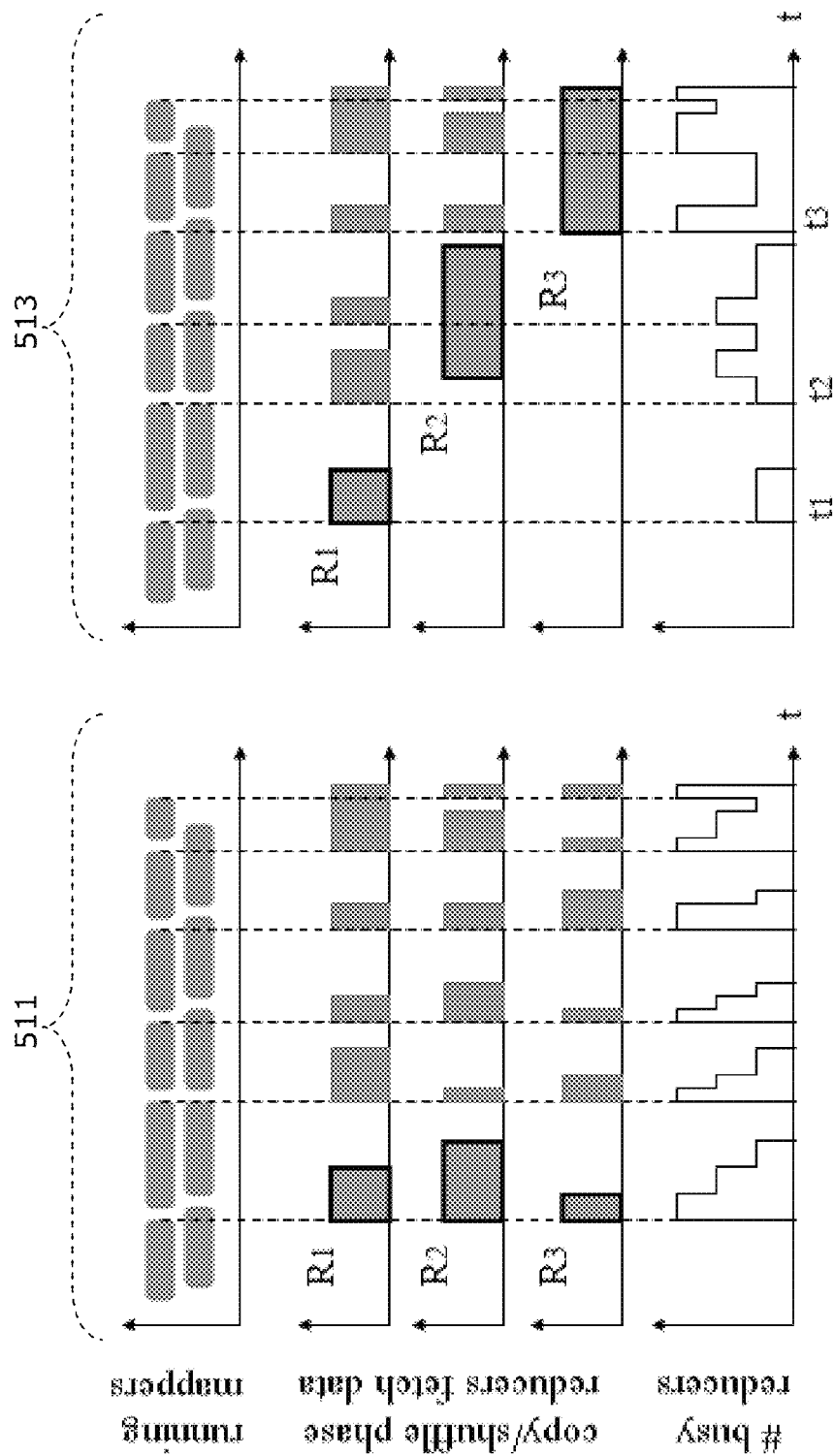
FIG. 5 graphically and comparatively illustrates different aspects of performance for a conventional scheduler and for a scheduler in accordance with at least one embodiment of the invention.

FIG. 5 graphically and comparatively illustrates different aspects of performance for a conventional scheduler (511) and for a scheduler in accordance with at least one embodiment of the invention (513). Here, it can be appreciated that performance improvement comes about from gradually launching reducers. During a copy/shuffle phase, each reducer (here denoted as R1, R2 and R3) includes a set of threads responsible for fetching map output bytes through disks or networks. Greedily launching reducers to a maximum causes these fetching activities (I/O and network intensive) on different reducers in sync, which slows down the running threads that share the same resources on the nodes that host the mappers (as shown in graphs 511). Mappers generate intermediate data that may be constantly spilled to disks after applying a quick-sort when the buffer overflows. These intermediate data are stored on the disks of the nodes that host the map tasks.

Thus, in accordance with at least one embodiment of the invention, a gradual launch of reducers can alleviate this sync problem. As demonstrated in graphs 513, between $t_1$ and $t_2$, only one reducer (R1) fetches intermediate data whereas in the conventional arrangement (511) three reducers (R1/R2/R3) establish HTTP connections simultaneously. Furthermore, the intermediate data need to be sorted and merged after arriving at each reducer. The merged files on which the reduce function will finally be applied are processed in multiple iterations as new map outputs keep being generated, possibly causing many paging activities. If these reducers happen to locate on the same node, then an assignment as illustrated in graphs 513, with reducers R1, R2 and R3 being launched at different timepoint, can alleviate disk I/O and CPU contention.

The disclosure now turns to a more detailed discussion of wait scheduling for reducers, in accordance with at least one embodiment of the invention. As mentioned hereabove, a gradual launching of reducers permits a possibility of improving the overall data locality by jointly optimizing placements of both mappers and reducers. As such, there can now be appreciated a degree of importance and desirability connected with data locality for reducers. First, placing a reducer on a rack that contains a number of nodes with stored intermediate data can reduce network traffic across the rack. Secondly, some jobs may only contain a small number of map tasks, and thus the generated intermediate data are stored on part of the nodes. In these scenarios, allocating reducers to the right places can greatly improve the performance of a large Hadoop cluster.

In accordance with at least one embodiment of the invention, reducers are placed closer to the "centrality" of the already generated intermediate data stored on a network, which (in embodiments) is assumed to be a tree for Hadoop. Inasmuch as reducers are launched gradually using a coupling scheduler, reducers that are launched later accumulate more information about the distribution of the intermediate data on the network.

To this end, in accordance with at least one embodiment of the invention, the "centrality" of intermediate data for a job i on a network can first be defined. As such, consider that a given network G=(V, E) comprises a set V of nodes together with a set E of edges. One can denote by h(v, u) the hop distance between node v and u, and by $w_i(u)$ the size of the data stored on node u for job i. Furthermore, denote by $V_d(i)$ the set of nodes that store the intermediate data for job i, and by $V_r$ the set of nodes that have available reduce slots. When transferring the stored data on node u to node v, the network cost is proportional to $w_i(u)h(v,u)$. Thus, for a job i, the total network cost of transferring all stored intermediate data to node v∈$V_r$ can be defined by $$C_i(v, V_d(i)) = \sum_{u \in V_d(i)} w_i(u)h(v, u).$$

$C_i(v,G)$ is computed for every v∈$V_r$, and there are only kept the smallest D values (e.g., an implementation set D=7) sorted in increasing order; the number of values in this list may be smaller than D if |$V_r$|D. The corresponding nodes associated with these values sorted in the same order is denoted by a list L(i). Accordingly, "centrality" is defined with respect to the first node v* in $L_i$, which minimizes $C_i(v, G)$ for all v∈$V_r$. Here tie-breaking can be applied through a random order.

In accordance with at least one embodiment of the invention, even when a node has an available reduce slot, Hadoop may still reject a reduce request since it has a resource estimator that determines whether a reduce request can be granted or not on a given node. Therefore, the "centrality" node may not be able to run the requested reducer. To this end, the list L(i) can be split into three groups: $L^1(i)$ only contains the "centrality" for job i; $L^2(i)$ contains the second and third node from list L(i); $L^3(i)$ contains the other nodes in L(i). Note that each of these groups may be empty if |$V_r$|<D.

In accordance with at least one embodiment of the invention, in each round of communications between the master node and the N slave nodes, the master node sequentially processes the N received heartbeats, which arrive in a random order. When it is ready to launch a reducer (mismatch >0), the slave node that just sent the heartbeat is not necessarily the node that is close to the data "centrality" for a job under consideration. In order to resolve this issue, wait scheduling can be applied to permit reducers to check up to 3×N number of heartbeats (three rounds). Within the first N heartbeats, a reducer is launched only to a node in $L^1(i)$. If this fails, then $L^2(i)$ is considered for the next N heartbeats. If this fails again, $L^3(i)$ is considered. In accordance with at least one embodiment of the invention, after three rounds, the reducer is assigned randomly to a node. If possible, there is avoided a situation of multiple reducers of a job on the same node.

In accordance with at least one embodiment of the invention, when receiving a heartbeat, the coupling scheduler loops over all the jobs present in the queue and finds the one with the largest positive mismatch value (m°) as a candidate for launching a reducer. If the candidate cannot launch a reducer close to its current data "centrality", it skips this current heartbeat. A counter (by way of waiting) is introduced to denote the number of skipped heartbeats; details are set forth in algorithm 615 shown in FIG. 6.

The disclosure now turns to a more detailed discussion of scheduling mappers, in accordance with at least one embodiment of the invention. As such, it can be recognized that data locality is an important issue with regard to moving computation close to data. Generally, a Hadoop file system stores input data as trunks that are distributed in the disks of the whole cluster. Therefore, the input data to a map task resides on one of the slave nodes, which can differ from the node where the map task is launched. Running a map task on a node that also contains the input data can reduce network traffic and greatly improve performance.

Generally, it can be recognized that mappers are highly sensitive to delays. As such, broadly contemplated herein, in accordance with at least one embodiment of the invention, is random peeking scheduling for avoiding delays, and as set forth in algorithm 717 in FIG. 7.

In accordance with at least one embodiment of the invention, based on the list of map task candidates, each candidate of job j is associated with a launching probability $p_j$, and then each of the map task candidates of job j are launched with probability $p_j$. When the slave node that just sends the heartbeat does have local inputs for job j, $p_j$ is set to 1; otherwise, set $p_j$ smaller than 1. In the latter case the scheduler launches a remote map task randomly, depending on 1) the fraction $\hat{p}_m$ of nodes that have local input data, 2) the number $\hat{N}_m$ of nodes that have available map slots and, 3) the number of pending mappers $M_p^j$ of job j. Choosing a good $p_j$ is based on the intuition that 1) if many other nodes have local data and available slots, then the schedule should skip the current heartbeat with high probability; 2) if job j has a large number of pending map tasks compared with $\hat{N}_m$, it is beneficial to launch remote mappers immediately with a certain probability.

In a heartbeat, in accordance with at least one embodiment of the invention, the master node randomly selects K nodes and checks how many (say, $K_1^j$) has local map inputs for a given job j and how many (say, $K_2$) has available map slots. The random sampling is to reduce the time complexity for a large cluster with N nodes. A medium/small size cluster can set K=N (e.g., consider by way of example, a set of 62 nodes with the scheduler checking every node). Then it estimates the percentage of nodes that have local map inputs $\hat{p}_m^j = K_1^j/K$ for job j and the total number $\hat{N}_m$ of nodes that have available map slots $\hat{N}_m = N \times K_2 / K$. Note that $\hat{p}_m^j$ tends to decrease as job j proceeds further. The implementation then sets:

$$p_j = \begin{cases} 1, & \text{if job } j \text{ has local data on a given node} \\ 1 - \alpha_j (\hat{p}_m^j)^{\beta_j} (1 - e^{-\hat{N}_m}), & \text{otherwise} \end{cases}$$

where $\beta_j = 0.1 + 0.9(1 - \exp(-M_p^j/\max\{\hat{N}_m, 1\}))$. $\alpha_j$ is set to 0.7 if job j has rack data with running reducers on the node, 0.8 if job j has rack data but no running reducers on the node, and 1.0 otherwise. This choice reflects a preference to place map tasks close to input data as well as running reducers of the same job. The schedule skips the current heartbeat for the considered job with probability $p_j$, expecting better data locality on the next heartbeat. This forms a Bernoulli sequence, which has an average of $1/p_j$ heartbeats. Below there are considered some extreme cases. When $\hat{N}_m$ is large, then $p_j$ is close to $1 - \alpha_j (\hat{p}_m^j)^{\beta_j}$. When $\hat{N}_m = 0$, then $p_j$ is equal to 1. In this case even when there is no local data on this node, it is beneficial to launch a remote map task immediately, since there are no enough map slots on other nodes.

Figure 8:
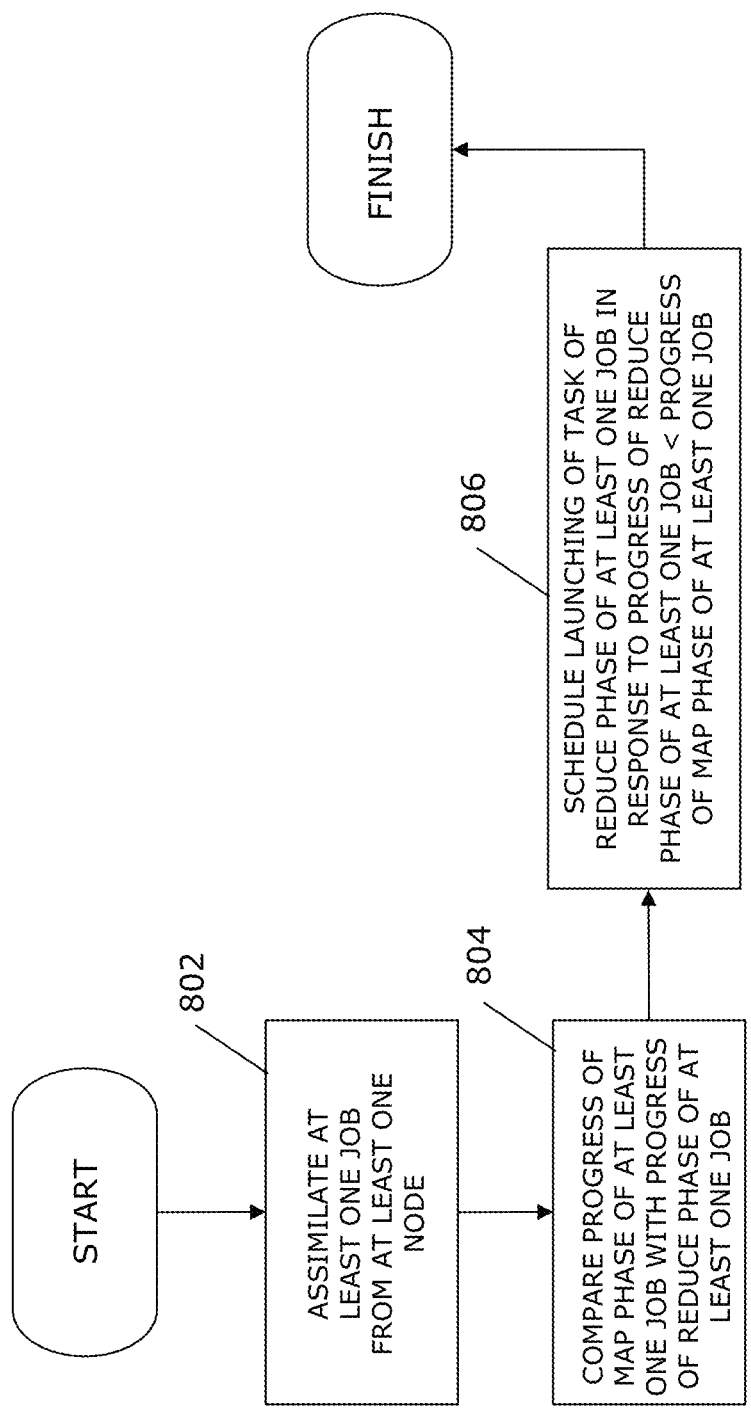
FIG. 8 sets forth a process more generally for task scheduling.

FIG. 8 sets forth a process more generally for task scheduling, in accordance with at least one embodiment of the invention. It should be appreciated that a process such as that broadly illustrated in FIG. 8 can be carried out on essentially any suitable computer system or set of computer systems, which may, by way of an illustrative and non-restrictive example, include a system such as that indicated at 12' in FIG. 9. In accordance with an example embodiment, most if not all of the process steps discussed with respect to FIG. 8 can be performed by way a processing unit or units and system memory such as those indicated, respectively, at 16' and 28' in FIG. 9.

As shown in FIG. 8, in accordance with at least one embodiment of the invention, at least one job is assimilated from at least one node, each job comprising at least a map phase and a reduce phase, each of the map and reduce phases comprising at least one task (802). Progress of a map phase of at least one job is compared with progress of a reduce phase of at least one job (804). Launching of a task of a reduce phase of at least one job is scheduled in response to progress of the reduce phase of at least one job being less than progress of the map phase of at least one job (806).

Figure 9:
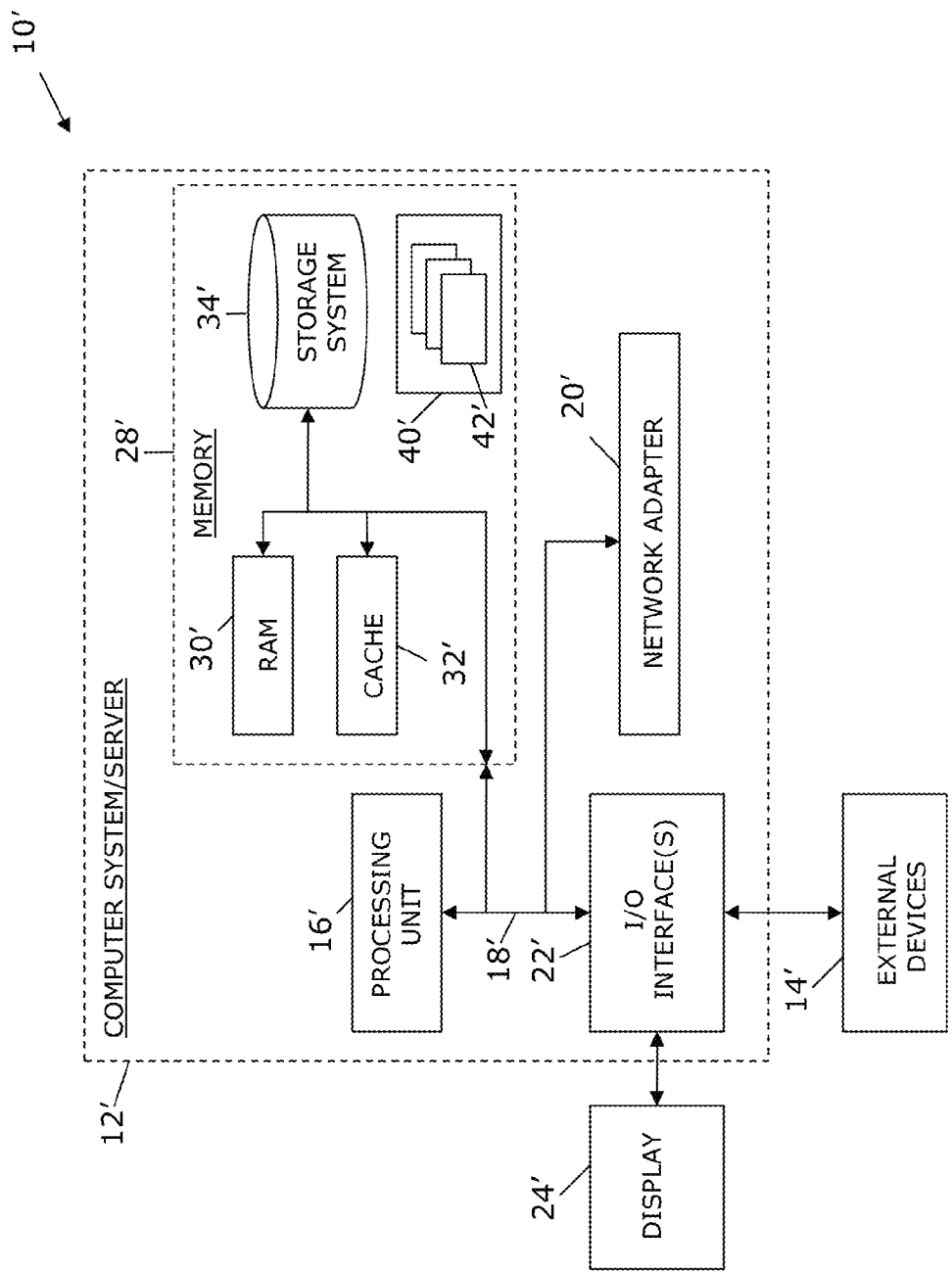
FIG. 9 illustrates a computer system.

Referring now to FIG. 9, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
    assimilating at least one job from at least one node, each job of the at least one job comprising at least a map phase and a reduce phase, each of the map and reduce phases comprising at least one task;
    comparing a percentage of completed map tasks of a map phase of the at least one job and a percentage of started reducers of the reduce phase of the at least one job; and
    scheduling incremental launching of the at least one task of a reduce phase of the at least one job in response to the percentage of started reducers of the reduce phase of the at least one job being less than progress the percentage of completed map tasks of the map phase of the at least one job.

2. The method according to claim 1, wherein said scheduling comprises assessing a viability of a launch of the at least one task of the reduce phase of the at least one job.

3. The method according to claim 2, comprising launching the at least one task of the reduce phase of the at least one job in response to an assessed viability of a launch.

4. The method according to claim 2, comprising delaying launch of the at least one task of the reduce phase of the at least one job in response to an assessed non-viability of a launch.

5. The method according to claim 1, wherein said comparing is performed in response to a heartbeat from the at least one node.

6. The method according to claim 1, wherein:
    each of the map and reduce phases of the each job comprises a plurality of tasks;
    said comparing comprises comparing a completion percentage of tasks of the map phase of at least one job with a function of a completion percentage of tasks of the reduce phase of the at least one job.

7. The method according to claim 1, wherein said comparing comprises calculating a mismatch value which characterizes a progress difference between the at least one task of the map phase of the at least one job with the at least one task of the reduce phase of the at least one job.

8. The method according to claim 1, comprising scheduling launching of a task of a map phase of at least one job in response to the the percentage of started reducers of the reduce phase of the at least one job not being less than the percentage of completed map tasks of the map phase of the at least one job.

9. The method according to claim 8, comprising assessing availability of local input data of a node.

10. The method according to claim 9, comprising launching a task of the map phase of the at least one job in response to an assessed availability of local input data at a node.

11. The method according to claim 9, comprising, in response to an assessed non-availability of local input data at the at least one node:
    determining a probability factor with respect to the at least one other node; and
    randomly launching a task of a map phase of at least one job based on the probability factor.

12. The method according to claim 11, wherein said determining comprises:
    assessing availability of local input data at the at least one other node;
    assessing capability of the at least one other node to run a task of a map phase; and
    determining a quantity of at least one pending task of a map phase of at least one job.

* * * * *